United States Patent
Kehat et al.

(10) Patent No.: US 8,111,945 B2
(45) Date of Patent: Feb. 7, 2012

(54) SYSTEM AND METHOD FOR PROVIDING A BLENDED PICTURE

(75) Inventors: Roy Kehat, Hod Hasharon (IL); Eran Barnea, Hod Hasharon (IL); Oskar Pelc, Even Yehuda (IL); Eyal Segev, Tel Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 820 days.

(21) Appl. No.: 12/179,792

(22) Filed: Jul. 25, 2008

(65) Prior Publication Data

US 2010/0021081 A1 Jan. 28, 2010

(51) Int. Cl.
*G06K 9/32* (2006.01)
*G09G 5/02* (2006.01)

(52) U.S. Cl. ....................... 382/284; 345/592

(58) Field of Classification Search ............ 382/162, 382/282, 305, 312; 345/426, 547, 582, 592, 345/629

See application file for complete search history.

(56) References Cited

U.S. PATENT DOCUMENTS

| | | | | |
|---|---|---|---|---|
| 5,831,627 A * | 11/1998 | Cohen | | 345/592 |
| 5,923,333 A * | 7/1999 | Stroyan | | 345/422 |
| 6,184,891 B1 * | 2/2001 | Blinn | | 345/426 |
| 6,226,017 B1 * | 5/2001 | Goossen et al. | | 345/531 |
| 6,342,882 B1 * | 1/2002 | Oka | | 345/419 |
| 6,891,550 B1 * | 5/2005 | Nolan | | 345/619 |
| 7,116,333 B1 * | 10/2006 | Peercy | | 345/582 |
| 7,701,463 B2 * | 4/2010 | Cochran | | 345/592 |
| 7,720,312 B2 * | 5/2010 | Maier et al. | | 382/302 |
| 7,881,527 B2 * | 2/2011 | Steele et al. | | 382/162 |
| 2006/0164437 A1 | 7/2006 | Kuno | | |
| 2007/0103483 A1 * | 5/2007 | Glen | | 345/592 |

* cited by examiner

*Primary Examiner* — Kanjibhai Patel (57) ABSTRACT

A method, a system and a computer program product for generating a blended picture, the system includes: a storage unit, adapted to store pixels of a first picture, pixels of a second picture and alpha data; and a device, coupled to the storage unit via at least one data channel; wherein the device includes: a relevancy determination module, that is adapted to determine a relevancy of pixels of at least one of the first picture and the second picture based upon values of alpha data associated with the pixels of the first picture; wherein the alpha data represents a degree of transparency of the pixels of the first picture to be overlaid over the second picture; an access controller, coupled to the relevancy determination module, adapted to prevent a transfer of irrelevant pixels from the storage unit; and a blending unit that is coupled to the access controller, adapted to provide a blended picture in response to values of the alpha data, by blending relevant pixels of the first and second picture.

20 Claims, 8 Drawing Sheets

```
┌─────────────────────────────────────────────────────────────────────────┐
│ Storing, in a storage unit, pixels of a first picture, pixels of a      │
│ second picture and alpha data. The alpha data represents a degree of    │
│ transparency of the pixels of the first picture. The first picture      │
│ should be overlaid on the second picture. 510                           │
└─────────────────────────────────────────────────────────────────────────┘
```

┌─────────────────────┐      ┌─────────────────────────────────────────────┐
│ Transferring, from  │      │ Transferring from the storage unit to a     │
│ the storage unit to │      │ device that includes a blending unit, alpha │
│ a device that       │      │ data associated with pixels of the first    │
│ includes a blending │      │ image. The alpha data can be transferred    │
│ unit, pixels of the │      │ over a second bus that differs from a first │
│ second image. 520   │      │ bus over which pixels of the second image   │
│                     │      │ and relevant pixels of the first image are  │
│                     │      │ transferred. 530                            │
└─────────────────────┘      └─────────────────────────────────────────────┘

┌─────────────────────────────────────────────┐
│ Determining a relevancy of pixels of a first│
│ picture based upon values of alpha data     │
│ associated with the pixels of the first     │
│ picture. 540                                │
└─────────────────────────────────────────────┘

┌─────────────────────────────────────────────┐
│ Transferring relevant pixels of the first   │
│ picture, from a storage unit to the device  │
│ and preventing a transfer of irrelevant     │
│ pixels of the first picture, from the       │
│ storage unit to the device. 550             │
└─────────────────────────────────────────────┘

┌─────────────────────────────────────────────────────────────────────────┐
│ Providing a blended picture, by the blending unit, in response to       │
│ values of the alpha data, by blending pixels of the second picture and  │
│ relevant pixels of the first picture that are overlaid over             │
│ corresponding pixels of the second picture. 560                         │
└─────────────────────────────────────────────────────────────────────────┘

```
┌─────────────────────────────────────────────────────────────────────────┐
│ Storing, in a storage unit, pixels of a first picture, pixels of a second picture and alpha │
│ data. The alpha data represents a degree of transparency of the pixels of the first │
│ picture. The first picture should be overlaid on the second picture. 510 │
└─────────────────────────────────────────────────────────────────────────┘
                                      │
                                      ▼
┌─────────────────────────────────────────────────────────────────────────┐
│ Transferring from the storage unit to a device that includes a blending unit, alpha data │
│ associated with pixels of the first image. The alpha data can be transferred over a │
│ second bus that differs from a first bus over which pixels of the second image and │
│ relevant pixels of the first image are transferred. 830 │
└─────────────────────────────────────────────────────────────────────────┘
                                      │
                                      ▼
┌─────────────────────────────────────────────────────────────────────────┐
│ Determining a relevancy of pixels of a second picture and a relevancy of pixels of the │
│ first picture. The determination is based upon values of alpha data associated with │
│ pixels of the first picture. 840 │
└─────────────────────────────────────────────────────────────────────────┘
                                      │
                                      ▼
┌─────────────────────────────────────────────────────────────────────────┐
│ Transferring relevant pixels of the second picture and of the first picture, from a │
│ storage unit to the device and preventing a transfer of irrelevant pixels of the second │
│ picture and of the first picture, from the storage unit to the device. 850 │
└─────────────────────────────────────────────────────────────────────────┘
                                      │
                                      ▼
┌─────────────────────────────────────────────────────────────────────────┐
│ Providing a blended picture, by the blending unit, in response to values of the alpha │
│ data, by blending relevant pixels of the second picture and relevant pixels of the first │
│ picture that are overlaid over corresponding pixels of the second picture. 860 │
└─────────────────────────────────────────────────────────────────────────┘
```

SYSTEM AND METHOD FOR PROVIDING A BLENDED PICTURE

FIELD OF THE INVENTION

This invention relates to systems and methods for generating a blended picture.

BACKGROUND OF THE INVENTION

A picture blending process known as alpha blending involves overlaying an upper picture over a second picture. The pixels of the upper picture can be fully transparent (hereinafter—transparent), partially transparent or opaque. The degree of transparency of the pixels of the upper picture is indicates by alpha data. US patent application publication 2006164437 discloses an example of a blending process.

Alpha blending involves reading, from a memory unit, all the pixels of the first picture, all the pixels of the second picture and alpha data. The reading process involves transferring the mentioned above information over one or more busses. In many integrated circuits the transfer slows down the blending process, especially if these one or more busses are used for other information transfers. For example, if the alpha blending is executed by an application processor these one or more busses can be used for transferring information during a decoding process, during a graphic processing operation, and the like.

SUMMARY OF THE INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE PREFERRED EMBODIMENTS

In the following specification, the invention will be described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It has been found that a blending process of a picture can be speeded up by reducing the amount of information that is transferred over one or more busses that are connected between a storage unit and a device that includes a blending unit. The data reduction involves reading from the storage unit only relevant pixels.

The blending process involves blending a first picture and a second picture. For simplicity of explanation only it is assumed that the first picture includes graphics while the second picture is a video picture that is a part of a video stream.

A system for generating a blended picture, the system includes: (i) a storage unit, adapted to store pixels of a first picture, pixels of a second picture and alpha data; and (ii) a device, coupled to the storage unit via at least one data channel; wherein the device includes: (a) a relevancy determination module, that is adapted to determine a relevancy of pixels of at least one of the first picture and the second picture based upon values of alpha data associated with the pixels of the first picture; wherein the alpha data represents a degree of transparency of the pixels of the first picture to be overlaid over the second picture; (b) an access controller, coupled to the relevancy determination module, adapted to prevent a transfer of irrelevant pixels from the storage unit; and (c) a blending unit that is coupled to the access controller, adapted to provide a blended picture in response to values of the alpha data, by blending relevant pixels of the first and second picture.

A method for generating a blended picture, the method includes: (i) determining a relevancy of pixels of at least one of a first picture and a second picture based upon values of alpha data associated with the pixels of the first picture; wherein the alpha data represents a degree of transparency of the pixels of the first picture to be overlaid over the second picture; (ii) transferring relevant pixels from a storage unit to a device that comprises a blending unit, and preventing a transfer of irrelevant pixels from the storage unit to the device; and (iii) providing a blended picture, by the blending unit, in response to values of the alpha data, by blending relevant pixels of the first picture and relevant pixels of the second picture.

A computer program product that comprises a computer readable medium that stores instructions for: (i) determining a relevancy of pixels of at least one of a first picture and a second picture based upon values of alpha data associated with the pixels of the first picture; wherein the alpha data represents a degree of transparency of the pixels of the first picture to be overlaid over the second picture; (ii) transferring relevant pixels from a storage unit to a device that comprises a blending unit, and preventing a transfer of irrelevant pixels from the storage unit to the device; and (iii) providing a blended picture, by the blending unit, in response to values of the alpha data, by blending relevant pixels of the first picture and relevant pixels of the second picture.

Figure 1:
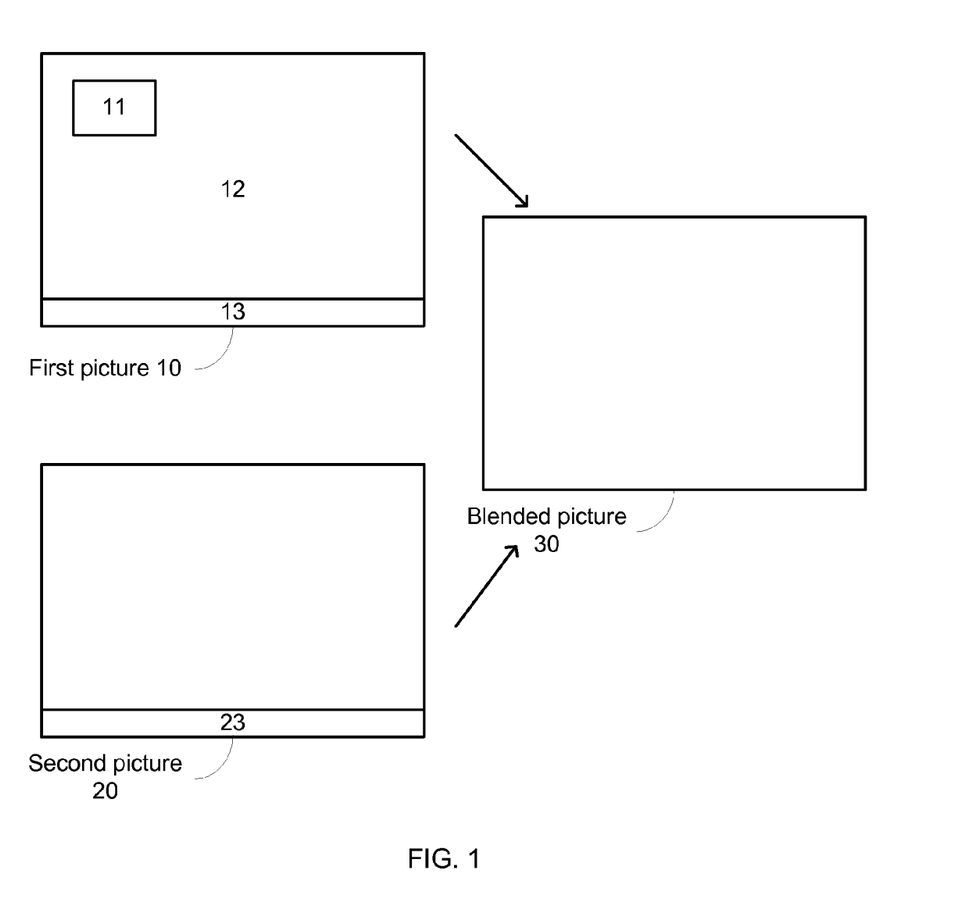
FIG. 1 schematically shows an example of an first picture and a second picture.

FIG. 1 schematically shows an example of first picture 10 and second picture 20. First picture 10 should be overlaid over second picture 20 during a blending process to provide blended picture 30. In many cases first picture 10 is mostly transparent. For example, first picture 10 can include a small logo and subtitles that are to be shown in the blended picture 30 whereas the other parts of the first picture are transparent.

In the example of FIG. 1, first picture 10 includes multiple partially transparent pixels 11, multiple transparent pixels 12 and multiple opaque pixels 13. Each of these pixels is associated with alpha data that indicates the degree of its transparency. A transparent pixel can for example be indicated with a value of the alpha data that equals zero while an opaque pixel can be indicated with a value of the alpha data that equals one.

Transparent pixels 12 of first picture 10 will not affect blended picture 30 while other pixels (11 and 13) of first picture 10 will affect blended picture 30.

Second picture 20 includes multiple pixels 23 that should be overlaid by opaque pixels 13 of first picture 10. Multiple pixels 23 of second picture and opaque pixels 13 are referred to as corresponding pixels. Each pixel of multiple pixels 23 is overlaid by a corresponding pixel of pixels 13. Pixels 23 will not affect blended picture 30 as they are overlaid by opaque pixels of the first picture 10.

Figure 2:
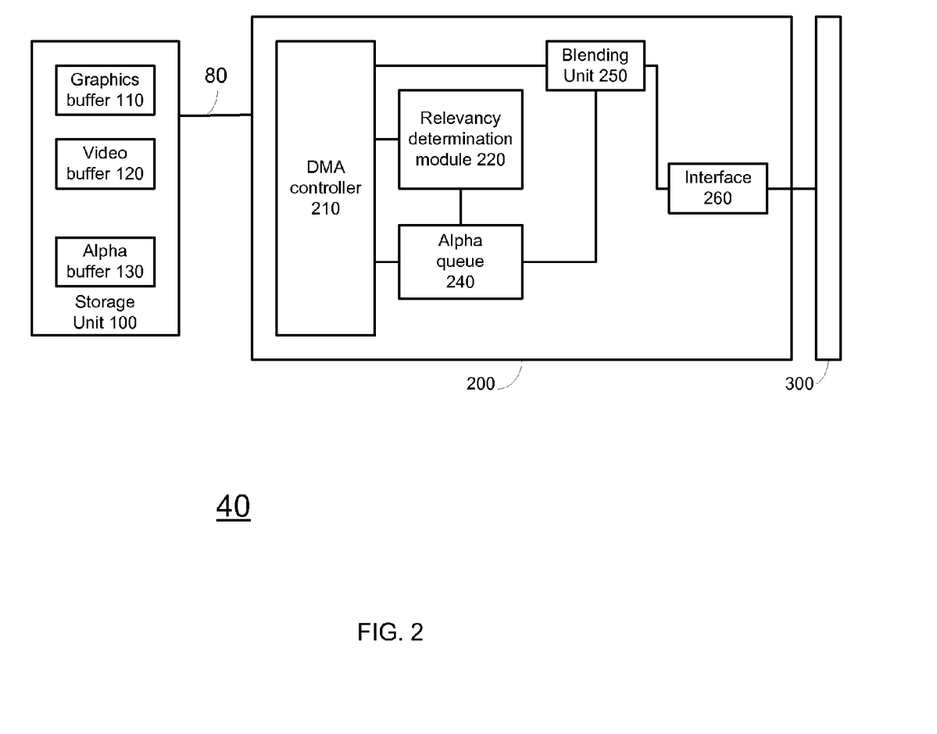
FIG. 2 schematically shows an example of an embodiment of a system for providing a blended picture.

FIG. 2 schematically shows an example of an embodiment of a system 40 having alpha blending capabilities.

System 40 includes storage unit 100 and device 200. Device 200 includes blending unit 250 and at least one data channel such as bus 80. Bus 80 is are connected between storage unit 100 and device 200. Device 200 can be a processor. It can be an application processor, a digital signal processor, a general-purpose processor or a graphics processor, but this is not necessarily so. Also, the processor may for example be a processor core of a single or multi-core processor or be a co-processor.

In the example of FIG. 2, device 200 is connected to display 300 via interface 260. Display 300 displays blended pictures generated by device 200. It is noted that device 200 can be connected to other components such as but not limited to a storage unit, a transmitter and the like.

In the shown example, storage unit 100 includes: (i) a first buffer (such as graphics buffer 110) for storing pixels of first picture 10, (ii) a second buffer (such as video buffer 120) for storing pixels of second picture 20, and (iii) alpha buffer 130 for storing alpha data associated with pixels of first picture 10.

Device 200 includes: (i) a transfer controller such as direct memory access (DMA) controller 210, (ii) relevancy determination module 220, (iii) alpha queue 240, (iv) blending unit 250 and (v) interface 260.

Relevancy determination module 220 reads alpha data from alpha queue 240 and determines a relevancy of pixels of first picture 10 that are stored in graphics buffer 110. The determination is responsive to the alpha data associated with these pixels. For example, a transparent pixel of first picture 10 is deemed irrelevant.

Relevancy determination module 220 sends a relevancy indication to DMA controller 210 that in turn transfers over first bus 80 only relevant pixels of first picture 10. In other words, DMA controller reads only relevant pixels of first picture 10 over bus 80 and does not read (prevents the transfer of) irrelevant pixels of first picture 10.

The selective reading of pixels of first picture 10 can dramatically shorten the reading process, especially when first picture 10 mostly includes transparent pixels.

The reading process may for example involve: reading alpha data associated with a group of one or more pixels of first picture 10; delaying a reading process of relevant pixels of the group until after a relevancy of pixels of the group is determined; and reading only relevant pixels of the group. First picture 10 can include multiple groups of pixels. In order to process the entire first picture multiple iterations of the mentioned above reading process may be executed.

Relevant pixels of first picture 10 and pixels of second picture 20 are sent to blending unit 250. Blending unit 250 performs a blending process to provide blended picture 30. Blended picture 30 can be sent, via interface 260, to display 300. The blending process is responsive to values of the alpha data.

Blending unit 250 may operate on a pixel-to-pixel basis. During each blending cycle it generates a pixel of blended picture 30. During each blending cycle it can expect to receive, an alpha value, a pixel of first picture 10 and a pixel of second picture 20. If the pixel of the first picture is irrelevant (and is not read to device 200) then the blending unit 250 can receive, instead of that irrelevant pixel, an irrelevant first picture pixel indicator or a pixel that is generated by device 200. The latter pixel can have any arbitrary value as it is associated with alpha data that indicates that it is transparent.

Figure 3:
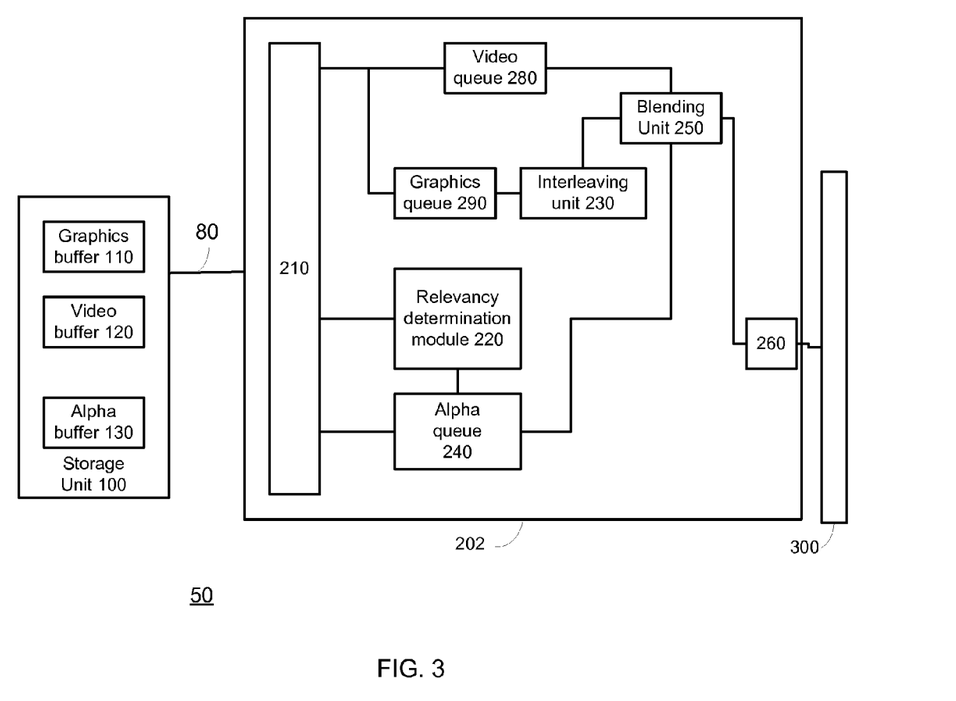
FIG. 3 schematically shows a second example of an embodiment of a system for providing a blended picture.

The example of a system 50 is illustrated in FIG. 3. differs from system 40 by having a device 202 that further includes: interleaving unit 230, graphics queue 270 and video queue 280 between DMA controller 210 and blending unit 250. It is noted that device 202 can include only one or two of these mentioned above components.

Interleaving unit 230 is connected to alpha queue 240, graphics queue 290 and blending unit 250. It receives relevant pixels of first picture 10 from DMA controller 210. It receives alpha data associated with these relevant pixels from alpha queue 240. It generates interleaved information from the relevant pixels of first picture 10 and from the alpha data.

Interleaving unit 230 can receive relevant pixels of first picture 10, for example each represented by an RGB sequence. The RGB sequence includes a Red colour value (R), a Blue colour value (B) and a green colour value (G). Interleaving unit 230 can add to the RGB sequence alpha data (A) to provide an interleaved RGBA sequence. The RGBA sequence is sent to blending unit 250.

Graphics queue 290 stores a group of relevant pixels of first picture 10. Video queue 280 stores a group of pixels of second picture 20. These queues are much smaller than buffers 110 and 120. These queues simplify the provision of information to blending unit 250 and relax the timing constraints imposed on the transfer of pixels over bus 80.

Figure 4:
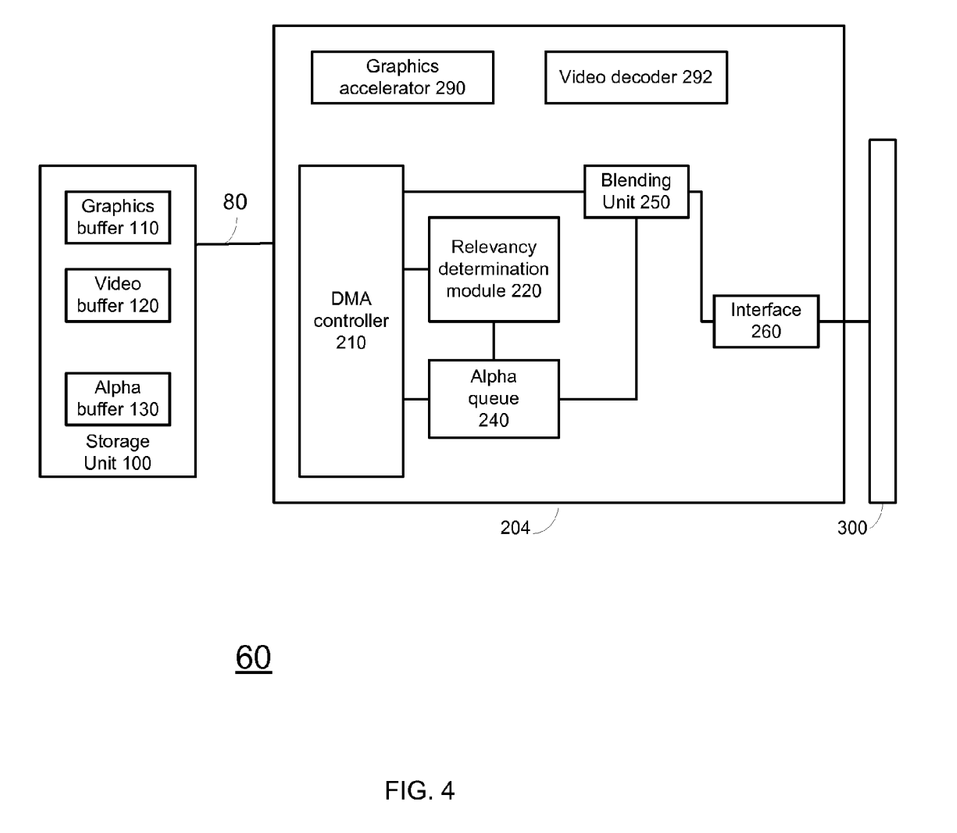
FIG. 4 schematically shows a third example of an embodiment of a system for providing a blended picture.

The example of a system 60 shown in FIG. 4 differs from system 40 by including device 204 that includes graphics accelerator 290 and video decoder 292. Both can utilize bus 80 for reading information from memory unit 100 and for writing information to memory unit 100.

The devices 200, 202 or 204 read from storage unit 100 only relevant pixels of first picture 10. Additionally or alternatively, device 200, 202 or 204 can read only relevant pixels of second picture 20. An irrelevant pixel of second picture 20 is a pixel that is overlaid by an opaque pixel of first picture 10.

Accordingly, relevancy determination module 220 can determine a relevancy of pixels of the second picture based upon values of alpha data associated with corresponding pixels of first picture 10 (pixels of first picture 10 that overly pixels of second picture 20). DMA controller 210 can control a transfer of relevant pixels of second picture 20, from storage unit 100 and prevent a transfer of irrelevant pixels of second picture 20, from storage unit 100. Blending unit 250 can then blend relevant pixels of the second picture 20 and pixels of the first picture 10.

Relevancy determination module 220 can for example determine that a pixel of second picture 20 is irrelevant if a value of alpha data associated with a corresponding pixel of first picture 10 indicates that the corresponding pixel of first picture 10 is opaque (and hence that this pixel of the second picture will not be visible in the blended picture 30).

Figure 5:
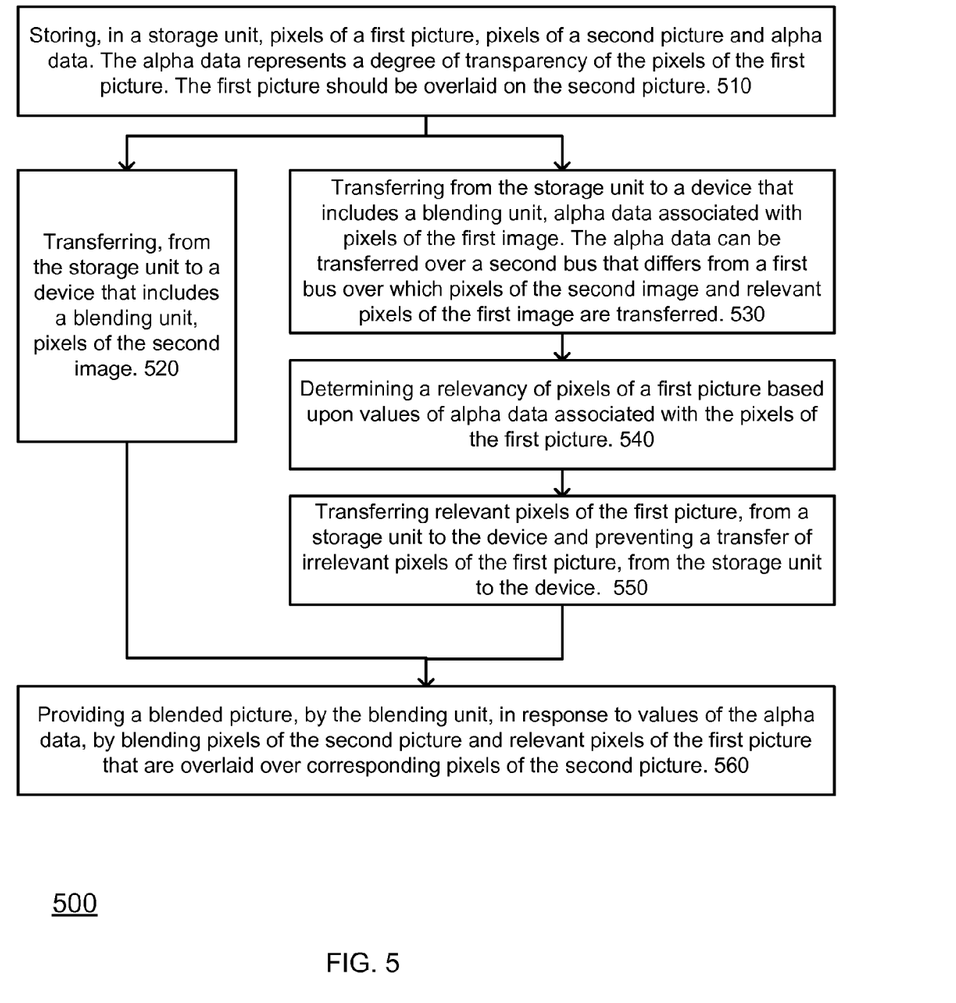
FIG. 5 schematically shows a flow-chart of a first example of embodiment of a method for generating a blended picture.

FIG. 5 schematically shows an example of embodiment of method 500 for generating a blended picture.

Method 500 starts by stage 510 of storing, in a storage unit, pixels of a first picture, pixels of a second picture and alpha data. The alpha data represents a degree of transparency of the pixels of the first picture. The first picture should be overlaid on the second picture. The first picture can include graphics while the second picture can be a part of a video stream.

Stage 510 is followed stages 520 and 530.

Stage 520 includes transferring, from the storage unit to a device that includes a blending unit, pixels of the second image. Stage 520 is followed by stage 560. The pixels of the second image can be transferred over a first bus.

Stage 530 includes transferring from the storage unit to a device that includes a blending unit, alpha data associated with pixels of the first image. The alpha data can be transferred over a second bus that differs from a first bus. The first bus can be used for transferring pixels of the second image and relevant pixels of the first image.

Stage 530 is followed by stage 540 of determining a relevancy of pixels of a first picture based upon values of alpha data associated with the pixels of the first picture.

Stage 540 can include determining that a pixel of the first picture is irrelevant if a value of alpha data associated with it indicates that the pixel of the first picture is transparent.

Stage 540 is followed by stage 550 of transferring relevant pixels of the first picture, from a storage unit to the device and preventing a transfer of irrelevant pixels of the first picture, from the storage unit to the device. Stage 550 can include reading only relevant pixels of the first picture.

Stage 550 is followed by stage 560 of providing a blended picture, by the blending unit, in response to values of the alpha data, by blending pixels of the second picture and relevant pixels of the first picture that are overlaid over corresponding pixels of the second picture.

Figure 6:
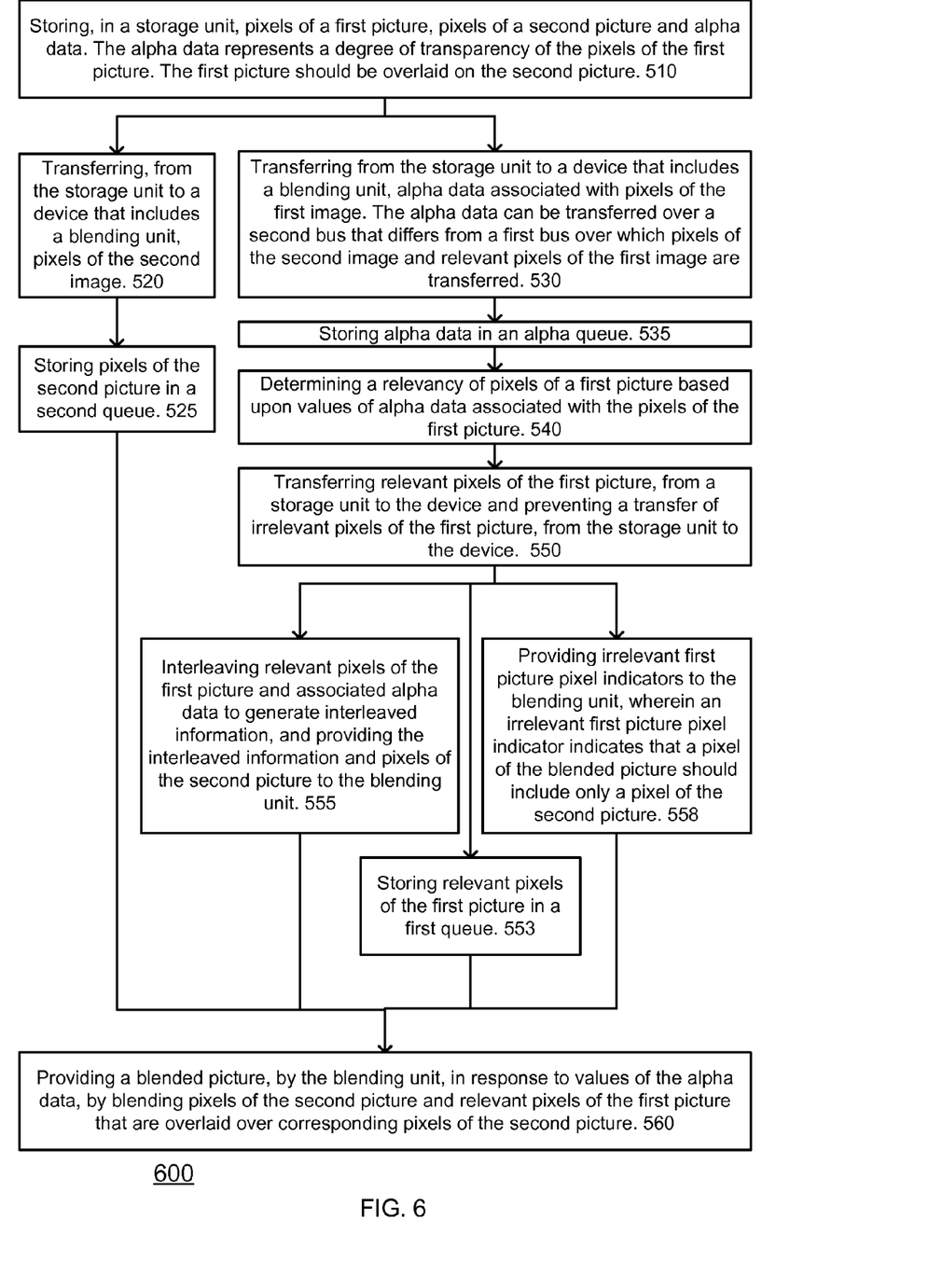
FIG. 6 schematically shows a flow-chart of a second example of embodiment of a method for generating a blended picture.

FIG. 6 schematically shows an example of embodiment of method 600 for generating a blended picture.

Method 600 differs from method 500 by including stages 525, 535, 553, 555 and 558. Stage 525 is preceded by stage 520 and followed by stage 530. Stage 535 is preceded by stage 530 and followed by stage 540. Stages 553, 555 and 558 are preceded by stage 550 and are followed by stage 560.

Stage 525 includes storing pixels of the second picture in a second queue. In the example of FIG. 3 the second queue is video queue 280.

Stage 535 includes storing alpha data in an alpha queue.

Stage 553 includes storing relevant pixels of the first picture in a first queue. In the example of FIG. 3 the first queue is video graphics queue 290.

Stage 558 includes providing irrelevant first picture pixel indicators to the blending unit, wherein an irrelevant first picture pixel indicator indicates that a pixel of the blended picture should include only a pixel of the second picture.

Stage 555 includes interleaving relevant pixels of the first picture and associated alpha data to generate interleaved information, and providing the interleaved information and pixels of the second picture to the blending unit.

Figure 7:
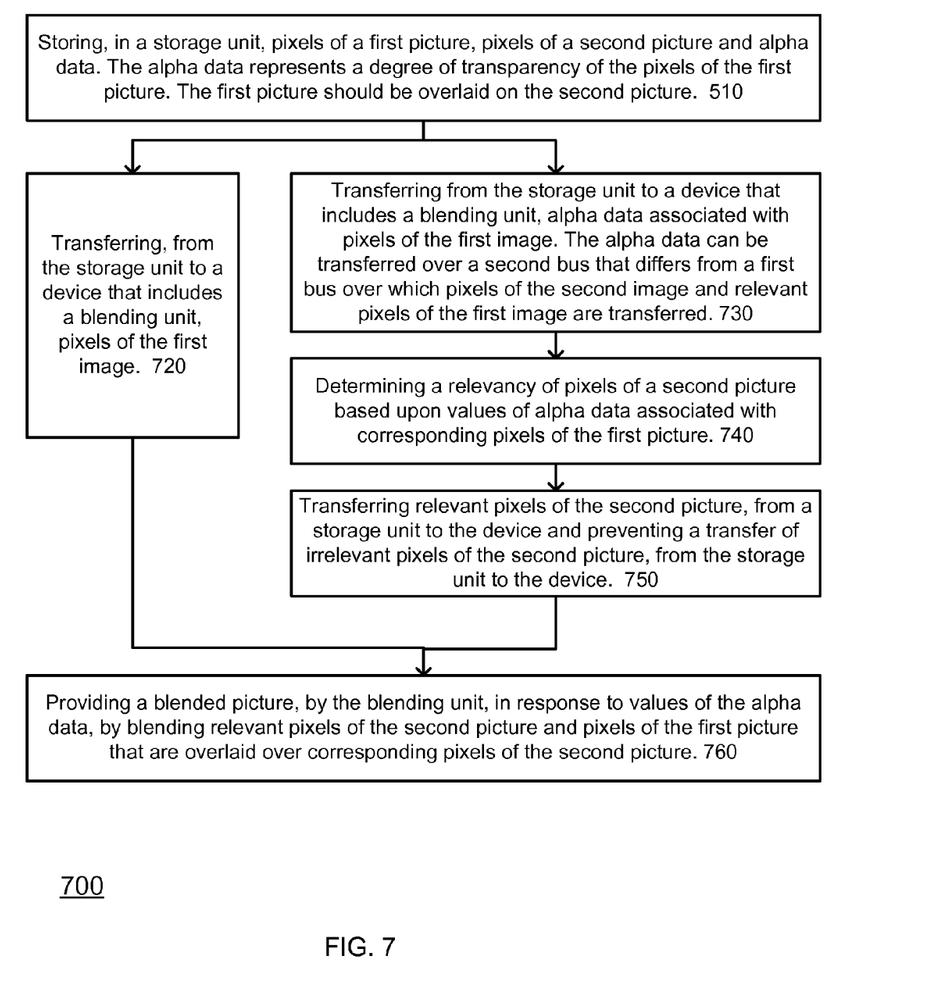
FIG. 7 schematically shows a flow-chart of a third example of embodiment of a method for generating a blended picture.

FIG. 7 schematically shows an example of embodiment of method 700 for generating a blended picture.

Method 700 starts by stage 510 of storing, in a storage unit, pixels of a first picture, pixels of a second picture and alpha data. The alpha data represents a degree of transparency of the pixels of the first picture. The first picture should be overlaid on the second picture. The first picture includes graphics while the second picture is a part of a video stream.

Stage 510 is followed stages 720 and 730.

Stage 720 includes transferring, from the storage unit to a device that includes a blending unit, pixels of the first image. Stage 720 is followed by stage 760.

Stage 730 includes transferring from the storage unit to a device that includes a blending unit, alpha data associated with pixels of the first image. The alpha data can be transferred over a second bus that differs from a first bus over which pixels of the second image and relevant pixels of the first image are transferred.

Stage 730 is followed by stage 740 of determining a relevancy of pixels of a second picture based upon values of alpha data associated with corresponding pixels of the first picture.

Stage 740 is followed by stage 750 of transferring relevant pixels of the second picture, from a storage unit to the device and preventing a transfer of irrelevant pixels of the second picture, from the storage unit to the device. Stage 650 can include reading only relevant pixels of the second picture.

Stage 750 is followed by stage 760 of providing a blended picture, by the blending unit, in response to values of the alpha data, by blending relevant pixels of the second picture and pixels of the first picture that are overlaid over corresponding pixels of the second picture.

Stage 740 can include determining that a pixel of the second picture is irrelevant if a value of alpha data associated a corresponding pixel of the first image indicates that the pixel of the first picture is opaque.

Method 700 can include stages that are analogues to either one of stages 525, 535, 545, 555 and 558.

Figure 8:
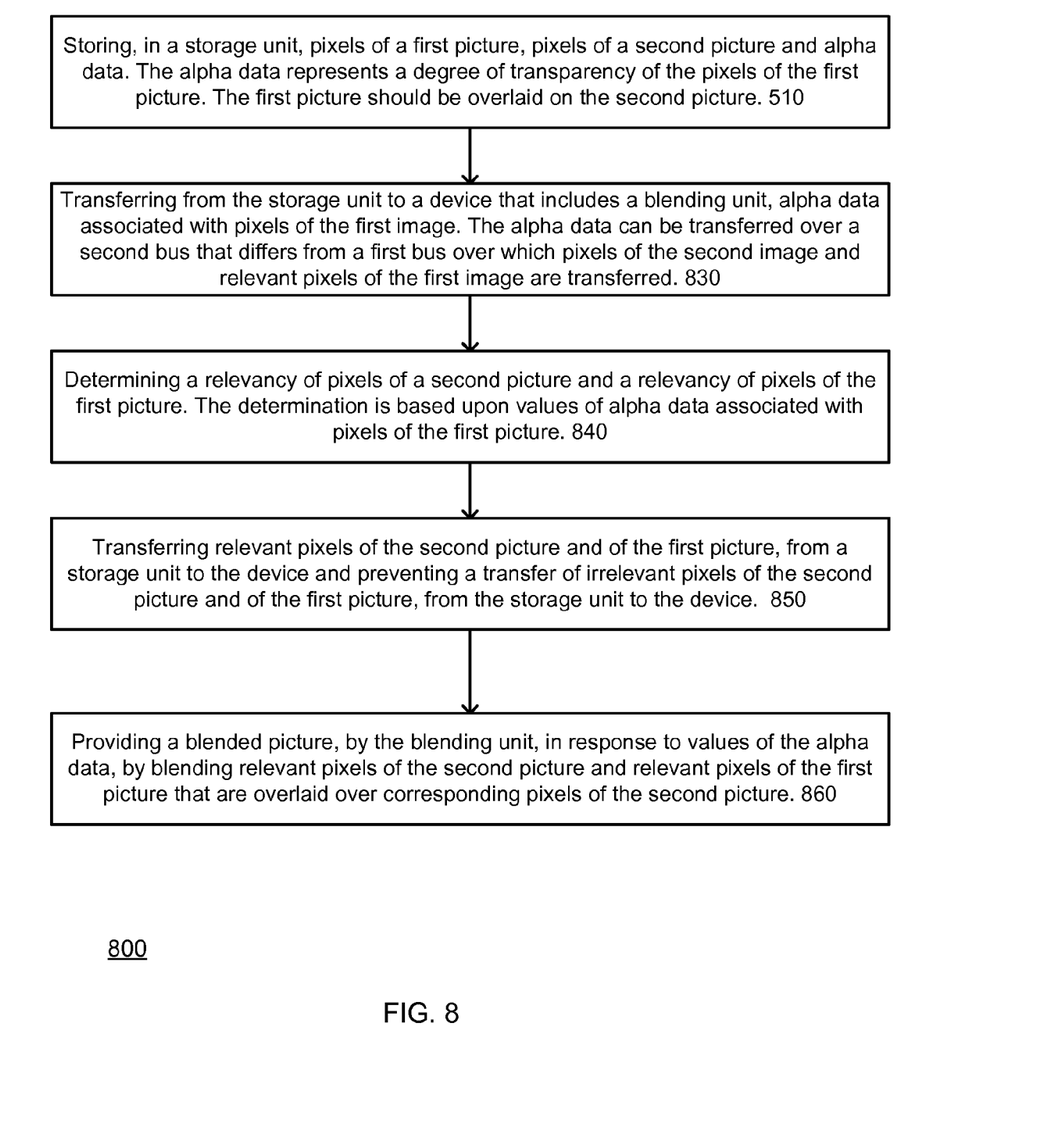
FIG. 8 schematically shows a flow-chart of a fourth example of embodiment of a method for generating a blended picture.

FIG. 8 schematically shows an example of embodiment of method 800 for generating a blended picture.

Method 800 starts by stage 510 of storing, in a storage unit, pixels of a first picture, pixels of a second picture and alpha data. The alpha data represents a degree of transparency of the pixels of the first picture. The first picture should be overlaid on the second picture. The first picture includes graphics while the second picture is a part of a video stream.

Stage 510 is followed stage 830.

Stage 830 includes transferring from the storage unit to a device that includes a blending unit, alpha data associated with pixels of the first image. The alpha data can be transferred over a second bus that differs from a first bus over which pixels of the second image and relevant pixels of the first image are transferred.

Stage 830 is followed by stage 840 of determining a relevancy of pixels of a second picture and a relevancy of pixels of the first picture. The determination is based upon values of alpha data associated with pixels of the first picture.

Stage 840 can include determining that a pixel of the first picture is irrelevant if a value of alpha data associated with it indicates that the pixel of the first picture is transparent. Stage 840 can also include determining that a pixel of the second picture is irrelevant if a value of alpha data associated with a corresponding pixel of the first picture indicates that the corresponding pixel of the first picture is opaque.

Stage 840 is followed by stage 850 of transferring relevant pixels of the second picture and of the first picture, from a storage unit to the device and preventing a transfer of irrelevant pixels of the second picture and of the first picture, from the storage unit to the device. Stage 850 can include reading only relevant pixels of the second picture and reading only relevant pixels of the first picture.

Stage 850 is followed by stage 860 of providing a blended picture, by the blending unit, in response to values of the alpha data, by blending relevant pixels of the second picture and relevant pixels of the first picture that are overlaid over corresponding pixels of the second picture.

Method 800 can include stages that are analogues to either one of stages 525, 535, 545, 555 and 558.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. In addition, if the logically true state is a logic level zero, the logically false state is a logic level one.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

Although some example have been described, it will be apparent that other embodiment may be conceived and/or that modifications may be made.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A system for generating a blended picture, the system comprises:
    a storage unit adapted to store pixels of a first picture, pixels of a second picture, and alpha data; and
    a device coupled to the storage unit via at least one data channel, wherein the device comprises:
        a relevancy determination module adapted to determine a relevancy of pixels of at least one of the first picture and the second picture based upon values of alpha data associated with the pixels of the first picture, wherein the alpha data represents a degree of transparency of the pixels of the first picture to be overlaid over the second picture;
        an access controller coupled to the relevancy determination module, the access controller adapted to prevent a transfer of irrelevant pixels from the storage unit; and
        a blending unit coupled to the access controller, the blending unit adapted to provide a blended picture in response to values of the alpha data by blending relevant pixels of the first and second picture.

2. The system according to claim 1 wherein the relevancy determination module determines that a pixel of the first picture is irrelevant if a value of alpha data associated with the pixel indicates that the pixel is transparent.

3. The system according to claim 1 wherein the relevancy determination module is adapted to determine a relevancy of pixels of the second picture based upon values of alpha data associated with corresponding pixels of the first picture.

4. The system according to claim 1 wherein the device further comprises:
    an interleaving unit coupled to the blending unit, the interleaving unit adapted to:

interleave relevant pixels of the first picture and associated alpha data to generate interleaved information; and provide the interleaved information and pixels of the second picture to the blending unit.

5. The system according to claim 1 further comprising an alpha queue adapted to store the alpha data.

6. A method for generating a blended picture, the method comprising:
   determining a relevancy of pixels of at least one of a first picture and a second picture based upon values of alpha data associated with the pixels of the first picture, wherein the alpha data represents a degree of transparency of the pixels of the first picture to be overlaid over the second picture;
   transferring relevant pixels from a storage unit to a device that comprises a blending unit, and preventing a transfer of irrelevant pixels from the storage unit to the device; and
   providing a blended picture, by the blending unit and in response to values of the alpha data, by blending relevant pixels of the first picture and relevant pixels of the second picture.

7. The method according to claim 6 further comprising determining that a pixel of the first picture is irrelevant if a value of alpha data associated with it indicates that the pixel of the first picture is transparent.

8. The method according to claim 6 further comprising:
   interleaving relevant pixels of the first picture and associated alpha data to generate interleaved information; and
   providing the interleaved information and pixels of the second picture to the blending unit.

9. The method according to claim 6 further comprising determining a relevancy of pixels of the second picture based upon values of alpha data associated with corresponding pixels of the first picture.

10. The method according to claim 6 further comprising storing alpha data at an alpha queue of the device.

11. A non-transitory computer readable medium storing a set of instructions, the set of instructions comprising instructions to manipulate a processor system to:
    determine a relevancy of pixels of at least one of a first picture and a second picture based upon values of alpha data associated with the pixels of the first picture, wherein the alpha data represents a degree of transparency of the pixels of the first picture to be overlaid over the second picture;
    transfer relevant pixels from a storage unit to a device that comprises a blending unit and preventing a transfer of irrelevant pixels from the storage unit to the device; and
    provide a blended picture, by the blending unit and in response to values of the alpha data, by blending relevant pixels of the first picture and relevant pixels of the second picture.

12. The computer readable medium of claim 11 wherein the set of instructions further comprises instructions to determine that a pixel of the first picture is irrelevant if a value of alpha data associated with the pixel indicates that the pixel is transparent.

13. The computer readable medium of claim 11 wherein the set of instructions further comprises instruction to:
    interleave relevant pixels of the first picture and associated alpha data to generate interleaved information; and
    provide the interleaved information and pixels of the second picture to the blending unit.

14. The computer readable medium of claim 11 wherein the set of instructions further comprises instructions to determine a relevancy of pixels of the second picture based upon values of alpha data associated with corresponding pixels of the first picture.

15. The computer readable medium of claim 11 wherein the set of instructions further comprises instructions to store alpha data at an alpha queue of the device.

16. The system according to claim 2 wherein the relevancy determination module is adapted to determine a relevancy of pixels of the second picture based upon values of alpha data associated with corresponding pixels of the first picture.

17. The system according to claim 2 wherein the device further comprises an interleaving unit coupled to the blending unit, the interleaving unit adapted to:
    interleave relevant pixels of the first picture and associated alpha data to generate interleaved information; and
    provide the interleaved information and pixels of the second picture to the blending unit.

18. The system according to claim 2 further comprising an alpha queue adapted to store the alpha data.

19. The method according to claim 7 further comprising:
    interleaving relevant pixels of the first picture and associated alpha data to generate interleaved information; and
    providing the interleaved information and pixels of the second picture to the blending unit.

20. The method according to claim 7 further comprising determining a relevancy of pixels of the second picture based upon values of alpha data associated with corresponding pixels of the first picture.

* * * * *